May 20, 1969     H. E. HAPPEL ET AL     3,444,805
METHOD OF AN AIR COOLED APPARATUS FOR THE
OPEN AIR COOKING OF EDIBLES
Filed April 4, 1967
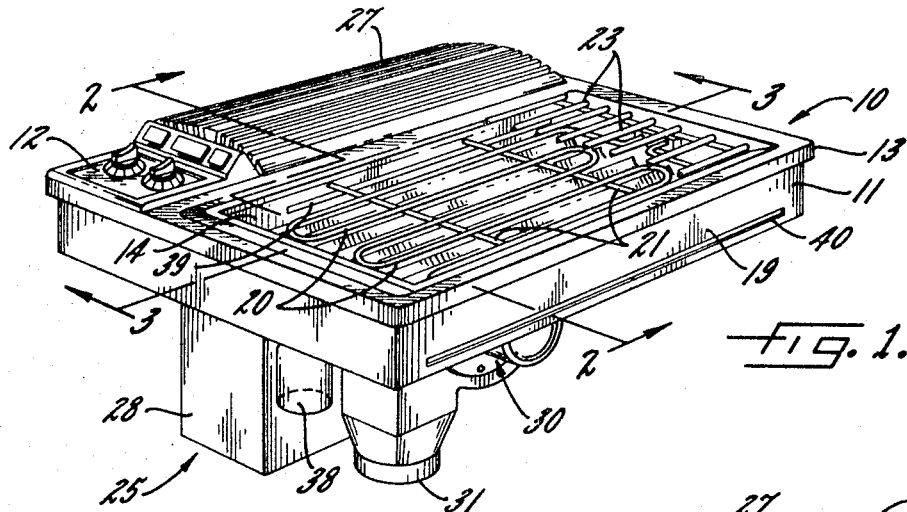
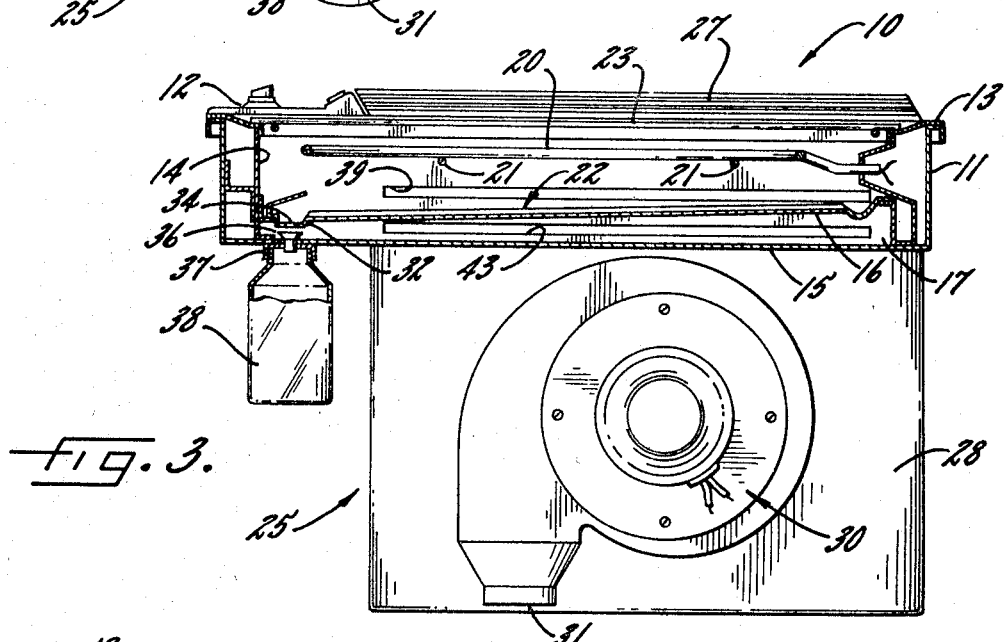
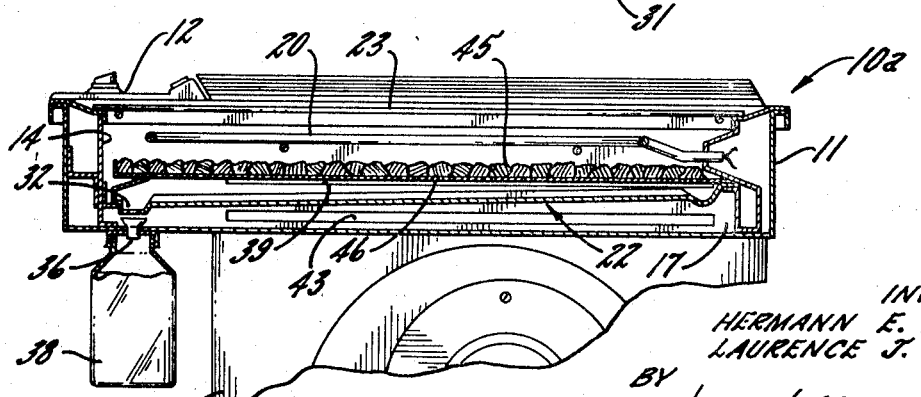
INVENTORS.
HERMANN E. HAPPEL
LAURENCE J. MITTER
BY Wolfe, Hubbard, Voit & Osann
ATTORNEYS.

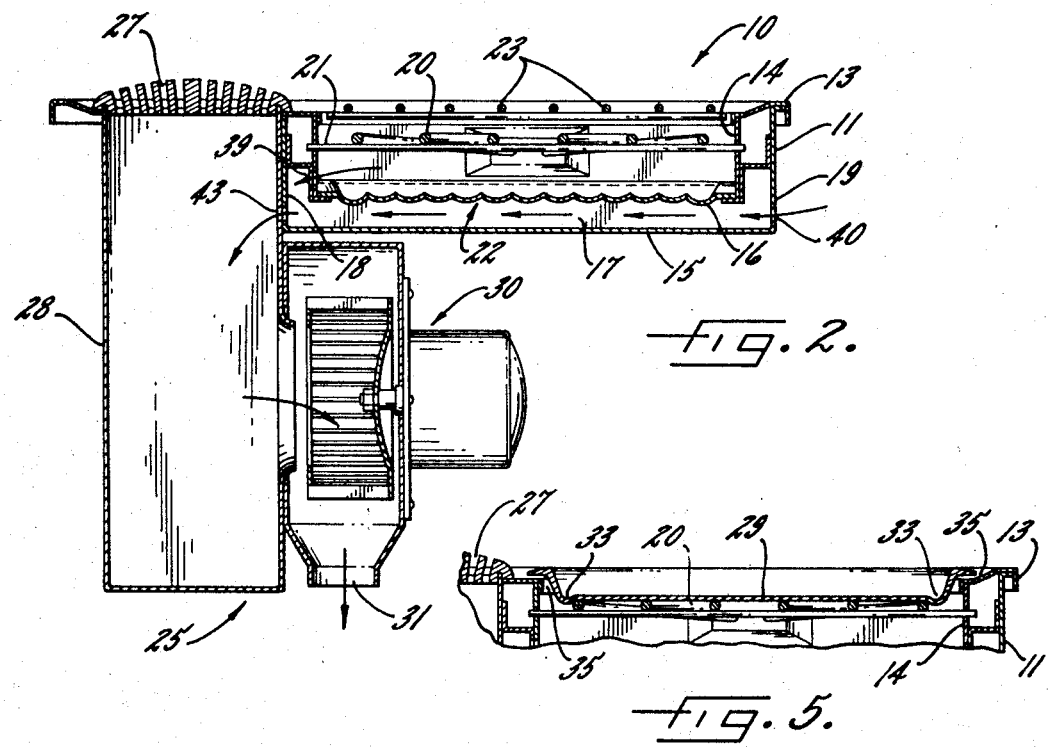
Fig. 2.
Fig. 5.
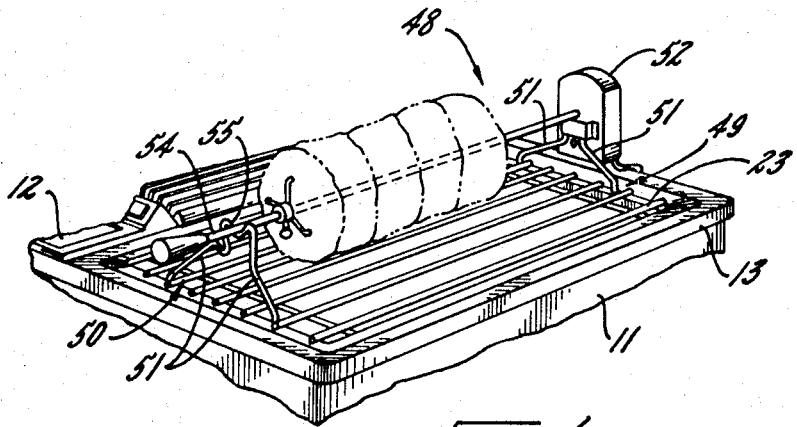
Fig. 6.

United States Patent Office 3,444,805
Patented May 20, 1969

3,444,805
METHOD OF AN AIR COOLED APPARATUS FOR THE OPEN AIR COOKING OF EDIBLES
Hermann E. Happel, Indianapolis, and Laurence J. Mitter, Carmel, Ind., assignors to Jenn-Air Corporation, Indianapolis, Ind., a corporation of Indiana
Filed Apr. 4, 1967, Ser. No. 628,499
Int. Cl. A47j *27/58;* F24c *15/14*
U.S. Cl. 99—340  10 Claims

ABSTRACT OF THE DISCLOSURE

A method of exposed surface broiling and grilling of edibles and an electric cooking apparatus of the surface broiler type, having a drain surface underlying the food supporting grill and the heating element for draining off the grease and fat drippings from cooking. To allow a high temperature heating element to be used without overheating the entire cooking apparatus and creating a fire hazard, and to reduce the possibility of the grease and fat drippings from igniting into a flash fire, an air conduit is provided adjacent to the drain surface and when the heating element is energized for cooking, cool air from the atmosphere is continuously drawn through this conduit resulting in a significant reduction in the operating temperature of the drain surface and adjoining structure.

BACKGROUND OF THE INVENTION

The present invention relates generally to an exposed surface broiling and grilling system including a new and improved electrical cooking device in the form of a broiler, griddle, rotisserie, or a combination of the three and more particularly to an improved device of the aforementioned type which greatly reduces the occurrence of grease fires resulting from the fat and grease drippings that occur during cooking.

In recent years, there has been an increasing demand for cooking devices of the outdoor charcoal barbecue type for use inside the home. Most of the units of this type which are presently available, utilize either gas or electricity as a heat source and additionally require the installation of a large and powerful ducted exhaust fan and hood to remove the smoke and grease laden vapors which occur during cooking. In addition, the presence of fat and grease drippings near the heat source of these units, create the ever present danger of the occurrence of a flash grease fire and in fact some of these units employ rather costly and complex dampering or reflecting apparatus to control grease and fat ignition so as to actually supplement the electric or gas heat source for cooking.

In order to prevent both excessive smoke and grease fires, and to provide a popularly priced unit for use within the home, a number of broiler-rotisserie units are now available which utilize an electric resistance heating element of relatively low wattage and an underlying drip pan that is adapted to be partially filled with water so that the dripping falling therein are immediately cooled. While units of this type provide substantially smoke and spatter free cooking without the possibility of a grease fire occurring, the low wattage element results in an appreciably long cooking time and equally important, it does not effectively sear meat so as to seal in the natural juices during cooking, which is what imparts the highly desired outdoor or barbecued flavor and prevents the meat from drying out during cooking. Additionally, the requirement of these units for water being maintained in their drip pan during cooking requires that additional water often has to be transported from the sink to the unit during cooking and that the unit has to be disassembled for cleaning and emptying after use. This is particularly cumbersome in the case where a unit of this type is built into a counter top.

SUMMARY OF THE INVENTION

Accordingly, it is a general aim of the present invention to provide a new and improved method and cooking unit for broiling, grilling and barbecuing meats, fish and other food, in which a heat source is utilized which produces a cooking temperature significantly higher than has heretofore been accomplished, without a corresponding prohibitive temperature increase occurring in the supporting structure and grease draining surfaces of the unit so as to present a fire hazard to adjacent cabinet material or from the ignition of fat and grease drippings. In this connection, it is a further object of the present invention to provide a cooking unit of the type referred to which requires a minimum of maintenance and cleaning and also accumulates grease and fat drippings in a manner wherein they can be simply removed without having to disassemble the unit.

It is another object of the present invention to provide a relatively low cost cooking unit of the type referred to which is capable of cooking meats at a temperature wherein a substantial amount of their natural juices are retained.

While the present invention is concerned with reducing the structural temperature and the occurrence of grease fires in a cooking unit of the type referred to while still being able to cook at a temperature high enough to seal in the juices of cooking meat, it is, nevertheless, an object of the invention to provide an improved cooking unit which presents an overall aesthetic and functional appearance with a minimum of cleaning operations following cooking and which is capable of being readily installed in a counter-top or other horizontal surface without occupying excessive cabinet space thereunder.

BRIEF DESCRIPTION OF THE DRAWINGS

Other objects and advantages of the invention will appear from the following description taken in conjunction with the accompanying drawings in which:

FIGURE 1 is a perspective view, with the grill depicted fragmentarily, of an exemplary broiler unit embodying the features of the present invention;

FIGURE 2 is a sectional view taken substantially along the line 2—2 of FIGURE 1;

FIGURE 3 is a sectional view, taken substantially along the line 3—3 of FIGURE 1;

FIGURE 4 is a fragmentary view similar to FIGURE 3 but here illustrating a modified cooking unit embodying the features of the present invention;

FIGURE 5 is a fragmentary view similar to FIGURE 2 but with the cooking grill removed and replaced with a griddle plate; and, FIGURE 6 is a perspective view similar to FIGURE 1, but here depicting the exemplary broiler unit of the present invention being used in conjunction with a removable powered rotisserie.

While the present invention is susceptible of various modifications and alternative constructions, illustrative embodiments are shown in the drawings and will herein be described in detail. It should be understood, however, that it is not intended to limit the invention to the particular forms disclosed, but, on the contrary, the intention is to cover all modifications, equivalents, and alternative constructions falling within the spirit and scope of the invention as expressed in the appended claims.

Referring now to FIGURES 1 through 3, an exemplary broiler unit, generally indicated at 10, is illustrated, the broiler including a rough-in box 11, a control panel 12, and a cover plate 13 sized to overlie the rough-in box 11. In a typical built-in installation, the rough-in box 11 is set down into a counter and the cover plate 13 lies flush with the counter-top. As best seen in FIGURE 2, a burner box 14 is mounted in the rough-in box 11 and disposed in a manner whereby its bottom 16 is spaced above the bottom 15 of the rough-in box 11 creating an air space 17, the purpose of which will soon become readily apparent to the reader. To provide a source of heat for cooking, an electrical resistance heating element 20 preferably of the shielded type, is horizontally disposed across the upper portion of the burner box 14 and below the surface of cover plate 13 by support rods 21. In order to support food while being cooked, a grill 23 is horizontally disposed above and in relatively close relationship to, the heating element 20 to insure that a maximum amount of heat emitted by the element 20 reaches food supported on the grill 23.

In order to eliminate the smoke, and grease laden vapors that are given off by food during cooking from permeating the interior of the house, the broiler unit 10 is mounted adjacent to a fume exhaust system generally indicated at 25. As best seen in FIGURE 2, this system includes an intake opening 27, a plenum housing 28 and a power driven exhaust fan 30. In operation, the actuation of the exhaust fan 30, continuously draws the air overlying the cooking grill 23 through the intake opening 27 and into the plenum housing 28 where it is then exhausted to the outdoors or back into the kitchen by means of ducting (not shown) extending from the discharge side 31 of the fan 30. Thus, it will be appreciated that the airborne smoke and grease laden vapors given off by food cooking on the grill 23 will likewise be drawn through the intake opening 27 and exhausted to the outdoors or filtered and returned to the kitchen before they can escape into the air surrounding the broiler unit 10.

In accordance with one of the important aspects of the present invention, provision is made for cooking on the broiler unit 10 at a temperature high enough to sear meat so that it will retain its natural juices during cooking, while maintaining the temperature of the rough-in box 11 and burner box 14 at a range which will enable the broiler unit 10 to be installed in a counter-top without creating a fire hazard and which furthermore will appreciably reduce the possibility of a flash fire occurring from the ignition of fat and grease that have dripped into the burner box 14. To accomplish this, an elongated slot 40 (FIGURES 1 and 2) opening into the air space 17, is provided in the outer side wall 19 of the rough-in box 11, and a second slot 43 is commonly provided in both the inner side wall 18 of the rough-in box and a side wall of the plenum housing 28, adjacent thereto, to provide air communication between the air space 17 and the inside of the plenum housing 28. Thus as figuratively depicted in FIGURE 2, upon the activation of the exhaust fan 30, a continuous supply of fresh air will be drawn into the slot 40, across the air space 17, and through slot 43 into the plenum chamber 28 where it is exhausted to the outdoors in a manner hereintofore described in conjunction with the exhaust system 25. As will be readily apparent to those versed in heat transfer, the continuous flow of fresh air across the air space 17 will, by means of convection, offset the heat transferred to the burner box 14, cover plate 13 and rough-in box 11 by the heating element 20, and therefore maintain the steady state operating temperature of these parts at a reduced level permitting in turn, the use of a heating element 20 having a substantially higher heat output. Additionally, if the broiler unit 10 is installed in a cabinet which does not permit fresh air from the kitchen to be drawn into slot 40, it is contemplated that the cabinet would be provided with an air hole, louver, or the like.

In order to impart additional cooling to the broiler unit 10, an additional flow of fresh air is provided across the upper surface of the bottom 16 of the burner box 14. To accomplish this, a slot 39 (FIGURE 2) is provided in the sidewall of the burner box 14 which establishes air communication between the burner box 14 and the interior of the plenum housing 28. Accordingly, when the fan 30 is activated, in addition to the air flow just described, air will also be drawn into and through the burner box 14 and then removed through the slot 39 into the plenum housing 28.

While in the exemplary apparatus, the broiler unit 10 is shown for convenience of illustration, in conjunction with the fume exhaust system 25, it is understood that it would be well within the scope and spirit of the present invention to provide the broiler unit 10 independently of the fume exhaust system 25, wherein the structure could be substantially similar to that described herein, but without an intake opening 27.

In accordance with another aspect of the present invention, provision is made for reducing the possibility of the occurrence of a flash fire resulting from the ignition of grease and fat drippings that have fallen into the burner box 14. This is accomplished in two distinct ways. The first is by reducing the operating temperatures of the parts of the broiler unit 10 which are exposed to these drippings as heretofore discussed, and the second is by preventing these drippings from accumulating at areas within the broiler unit 10 where they would be exposed to heat high enough to raise them to their flash point. In furtherance of this second aim, and with reference to FIGURES 2 and 3, the bottom 16 of the burner box 14 is formed to define an angularly disposed drip pan 22 terminating in a channel 32 formed at its lowermost portion and extending across the drip pan 22 in a transverse relationship to its angular disposition. As best seen in FIGURE 3, the channel 32 is provided with a drain aperture 34 which overlies a funnel 36, the spout of which passes through both the bottom 15 of rough-in box 11 and a jar lid 37 which is permanently secured thereto in order to receive a removable grease collecting jar 38.

Accordingly, when cooking is taking place on the broiler unit 10, the grease and fat released from the food will drip down through the food supporting grill 23, on to the drip pan 22 and flow downwardly thereon into the channel 32 wherefrom it will drain through the aperture 34 and be directed by the funnel 36 into the grease collecting jar 38. It will also be appreciated that by providing a standard size jar lid 37, the jar 38 can be disposed of when filled and easily and inexpensively replaced, thus eliminating any necessity for its emptying or cleaning or if desired they could be used for cooking purposes such as, for example, basting or making gravy.

In the situation where it is desired to cook on a solid food supporting surface such as when frying eggs, pancakes, or the like, the grill 23 is replaced with a griddle plate 29 shown in section in FIGURE 5. To permit transfer of a maximum amount of heat to the griddle plate 29, the latter is adapted to rest directly on the heating element 20, and is disposed at a slight angle (not shown) so that grease or fat will run down its integral peripheral drainage trough 33 and drain into the burner box 14 through an aperture (not shown) provided in a lower portion of the drainage trough 33. In addition, the griddle plate 29 is also adapted so that when set in place for cooking, a slight air gap 35 will exist between its periphery and the burner box 14 in order to allow air to be drawn into and through the burner box 14 as previously described. This is of particular importance when the griddle plate 29 is in use since it substantially closes the burner box 14 which would cause the temperature of the air standing therein to increase to an excessive level which in turn would cause a corresponding rise in the temperature of the burner box and could possibly result in a flash fire or structural failure. It is also contemplated that air could also be drawn into the burner box through one or more apertures (not shown) provided in the drainage trough 33 of the griddle plate 29.

Turning next to FIGURE 4, there is shown a slightly modified type of broiler unit 10a which is similar in construction and operation to the broiler unit 10 described above and also embodying the present invention. In view of the similarity between these two exemplary fixtures, like parts in both fixtures will be designated by identical reference numerals and those parts not common to the two fixtures will be designated by different reference numerals.

In order to impart an appearance more closely resembling a charcoal barbecue unit, the broiler unit 10a is provided with a horizontal bed of simulated charcoal briquettes 45 which underlie the heating element 20. The briquettes are preferably pieces of refractory type material and during cooking absorb enough heat so as to cause grease drippings falling on them, to smoke thus imparting added flavor to cooking meat.

In order that the bed of briquettes 45 does not interfere with the drainage and accumulation of grease and fat drippings within the broiler unit 10a, the simulated briquettes 45 are supported on a perforated tray 46 which is adapted to overlie the drip pan 22. Thus when drippings fall into the burner box 14, of the broiler unit 10a, they first contact the briquettes 45, run off onto the perforated tray 46 and drip therethrough onto the drip pan 22.

Turning next to FIGURE 6, it will be observed that the exposed surface broiler unit of the present invention can also be conveniently used in conjunction with any suitable powered rotisserie; a typical rotisserie being generally indicated at 48. As here shown, the rotisserie 48 includes a pair of spaced brackets 49, 50 having leg portions 51 adapted to pass through the grill 23 for supporting the rotisserie 48 in any conventional manner (not shown). For example, the leg portions 51 could be received within suitable openings formed in the counter top or rough-in box 11; or, alternatively, the leg portions 51 could have flange-like feet adapted to be positioned between the grill 23 and the cover plate 13. Moreover, the two brackets 49, 50 could be interconnected to form a rigid self-supporting stand. A powered rotisserie drive motor 52 is suspended from bracket 49 in a conventional manner. A rotatable spit 54 has one end rotatably mounted in a U-shaped portion 55 of bracket 50, the opposite end of the spit being drivingly connected to the drive motor 52. The arrangement is such that during cooking, the edible product is rotated so as to cook in its own juices, with those drippings that do result passing through the grill 23 and being collected in the underlying drip pan..

What is claimed is:
1. Apparatus for exposed surface broiling and grilling comprising, in combination:
 (a) a housing;
 (b) a heat source supported by said housing;
 (c) support means for maintaining edibles for cooking in an exposed position open to the atmosphere and in overlying heat-exchange relation to said heat source;
 (d) grease collecting means situated below and in proximity to said heat source for catching grease drippings from said edibles;
 (e) air conduit defining means contiguous to and substantially co-extensive with said grease collecting means;
 (f) said air conduit defining means having at least one external air inlet, and outlet means for permitting removal of air which has passed said grease collecting means in heat exchange relation therewith a a point remote from said heat source and said support means wrereby contact between heated cooling air and both falling grease drippings and grease collected in said grease collecting means is minimized; and,
 (g) a power driven fan disposed in said air conduit defining means for forcibly moving a continuous stream of air through said inlet and past said grease collecting means in heat exchange relation therewith for reducing the maximum temperature attainable by said grease collecting means as a result of its proximity to said heat source and for maintaining said maximum temperature below the level required to ignite drippings collected in said grease collecting means.

2. Apparatus for exposed surface broiling and grilling as set forth in claim 1 further characterized in that said air conduit defining means includes a plurality of external air inlets.

3. Apparatus as set forth in claim 1 or 2 further characterized in that at least a portion of said air conduit characterized defining means defines an air conduit disposed immediately beneath said grease collecting means and in heat exchange relation therewith.

4. Apparatus as set forth in claim 1 or 2 further characterized in that at least a portion of said air conduit defining means defines an air conduit disposed immediately above said grease collecting means and in heat exchange relation therewith with said air conduit being beneath said heat source and said support means.

5. Apparatus as set forth in claim 2 further characterized in that said air conduit defining means defines a first air conduit disposed immediately beneath said grease collecting means and a second air conduit disposed immediately above said grease collecting means, each of said air conduits being in heat exchange relation with said grease collecting means and each being coupled to at least one of said plurality of external air inlets.

6. Apparatus as set forth in claim 2 or 5 further characterized in that at least one of said plurality of air inlets is disposed adjacent to and substantially in the plane of said support means, said at least one air inlet being substantially co-extensive with said support means, whereby air containing odorous cooking fumes and gases is continuously removed through said at least one air inlet from the region overlying said support means.

7. Apparatus as set forth in claims 1, 2 or 5 further characterized in that said grease collecting means includes a drip pan, said drip pan comprising a portion of said air conduit defining means.

8. Apparatus as set forth in any of claims 1, 2 or 5 further characterized in that said support means comprises a power driven rotatable spit.

9. Apparatus for exposed surface broiling and grilling comprising, in combination:
 (a) a housing;
 (b) a heat source supported by said housing;
 (c) a removable plate-like griddle mounted on said housing for supporting edibles in an exposed position open to the atmosphere and in overlying heat-exchange relation to said heat source;
 (d) said griddle having an opening for discharging grease from said edibles;
 (e) grease collecting means situated below said plate-like griddle and below and in proximity to said heat source for catching grease drippings from said griddle opening;
 (f) at least one of said housing and said griddle forming a first external air inlet;
 (g) a second external air inlet disposed beneath said housing;
 (h) air conduit defining means contiguous to and substantially co-extensive with said grease collecting means;
 (i) said air conduit defining means forming:
  (1) a first air conduit coupled to said first external air inlet for permitting the flow of cooling air through said first inlet and across the upper surface of said grease collecting means in heat exchange relation therewith, and (2) a second air conduit disposed beneath said grease collecting means and coupled to said second external air inlet for permitting the flow of cooling air through said second inlet and across the lower surface of said grease collecting means in heat-exchange relation therewith; and, (j) power driven fan means disposed in said air conduit defining means for forcibly moving continuous streams of air through said first and second external air inlets and through said first and second air conduits for reducing the maximum temperature attainable by said grease collecting means as a result of its proximity to said heat source and for maintaining said maximum temperature below the level required to ignite drippings collected in said grease collecting means.

10. The method of exposed surface broiling and grilling of edibles while simultaneously minimizing the danger of burning of grease drippings collected from the edibles comprising the steps of:

(a) positioning a heat source in a housing;

(b) supporting the edibles for cooking in an exposed position open to the atmosphere and in overlying relation to the heat source;

(c) collecting grease drippings in a pan disposed beneath the heat source;

(d) forcibly directing streams of cooling air drawn directly from atmosphere across the upper and lower surfaces of the pan in heat exchange relation therewith for reducing the maximum temperature attainable by the pan as a result of its proximity to the heat source and for maintaining the maximum temperature below the level required to ignite drippings collected in said pan; and, (e) exhausting the cooling air immediately after the air streams pass over the upper and lower surfaces of the pan.

References Cited

UNITED STATES PATENTS

| | | | |
|---|---|---|---|
| 1,745,340 | 1/1930 | Parker | 99—446 |
| 2,696,162 | 12/1954 | Michaelis et al. | 99—425 |
| 2,715,173 | 8/1955 | Farquharson. | |
| 2,812,706 | 11/1957 | Del Francia et al. | 99—446 |
| 2,903,549 | 9/1959 | Joseph | 99—446 XR |
| 3,088,396 | 5/1963 | Proffitt | 99—446 XR |
| 3,095,495 | 6/1963 | Gvozdjak et al. | 99—446 XR |
| 3,098,477 | 7/1963 | Lotter. | |
| 3,246,690 | 4/1966 | Fry | 219—400 XR |
| 3,322,060 | 5/1967 | Gilbert | 99—421 |
| 3,363,088 | 1/1968 | Keppler | 219—400 XR |

WALTER A. SCHEEL, *Primary Examiner.*

J. M. NEARY, *Assistant Examiner.*

U.S. Cl. X.R.

99—421, 446, 447